United States Patent [19]

Hoshi et al.

[11] 4,409,156

[45] Oct. 11, 1983

[54] PROCESS FOR PRODUCING MICROCAPSULES

[75] Inventors: Yoshiyuki Hoshi; Takayuki Hayashi, both Fujinomiya, Japan

[73] Assignee: Fuji Photo Film Co., Ltd., Kanagawa, Japan

[21] Appl. No.: 193,059

[22] Filed: Oct. 2, 1980

[30] Foreign Application Priority Data

Oct. 2, 1979 [JP] Japan .................. 54-126968

[51] Int. Cl.³ ............................................. B01J 13/02
[52] U.S. Cl. ........................................ 264/4.33; 8/526; 71/DIG. 1; 252/174.13; 252/299.01; 252/388; 252/522 A; 424/32; 426/89; 428/320.6; 428/402.21; 428/914
[58] Field of Search .......................................... 252/316

[56] References Cited

U.S. PATENT DOCUMENTS

| 3,447,945 | 6/1969 | Mishima et al. | 252/316 X |
| 3,897,361 | 7/1975 | Saeki et al. | 252/316 |
| 4,100,103 | 7/1978 | Foris et al. | 252/316 |
| 4,251,386 | 2/1981 | Saeki et al. | 252/316 |

*Primary Examiner*—Richard D. Lovering
*Attorney, Agent, or Firm*—Sughrue, Mion, Zinn, Macpeak and Seas

[57] ABSTRACT

A process for producing microcapsules comprising forming capsule membranes of a polymer of melamine and formaldehyde in the presence of a styrene-sulfonic acid polymer.

10 Claims, No Drawings

PROCESS FOR PRODUCING MICROCAPSULES

BACKGROUND OF THE INVENTION

1. Field of the Invention

The present invention relates to a process for producing microcapsules. In greater detail, it relates to a process for producing microcapsules in which a hydrophobic core material is covered with melamine-formaldehyde resin in the aqueous medium.

2. Description of the Prior Art

Microencapsulation is carried out to change the apparent state and properties of the core material, protect the material in a finely-divided form, control release, and release the contents at the time desired.

In recent years, application of microcapsules to image recording materials, medicines, perfumes, agricultural chemicals, chemicals, adhesives, foods, detergents, dyes, solvents, catalysts, enzymes, rust inhibitors, etc., has been studied, and pressure-sensitive copying paper, aspirin capsules, perfume capsules, pressure-sensitive capsule adhesives, active charcoal capsules, enzyme capsules, liquid crystal capsules and methylparathion capsules, etc. have been put to practical use.

Further, for the purpose of satisfying certain functional, operational and economic aspects of production, various encapsulation processes have been proposed. As generally known processes for producing microcapsules, there are physical processes, mechanical processes, physiochemical processes and chemical processes. However, the physical processes and the mechanical processes are only utilized for production of capsules having special uses, because they require a particular apparatus. The resulting capsules are large particles having a particle size of several ten microns or more and the tightness of the membrane of capsule wall is insufficient.

Physiochemical and chemical processes have the advantages that they do not require a special apparatus, it is possible to produce capsules having any desired particle size ranging from less than 1 micron to several millimeters, and it is possible to control the tightness of the membrane of capsule wall. Accordingly, they are of great practical value, because they can be used for various purposes. Examples of these processes include coacervation, interfacial polymerization and in situ polymerization. The coacervation process has been used in a wide variety of fields, but it has the drawbacks that the capsules produced have inferior water resistance, they are expensive, and a capsule solution having a high concentration is difficult to obtain because gelatin is an indispensable component and the steps of encapsulation are complicated. The interfacial polymerization process of forming capsules by a polymerization reaction of a hydrophobic monomer and a hydrophilic monomer on the interface of a core material has the drawbacks that the process involves restricted handling on toxicity, stability, etc., it deteriorates a core material having active hydrogen atoms or encapsulation is impossible, the reaction is difficult to control, and the membrane of the capsule walls is difficult to thicken, etc., because it employs substances having a high reactivity (e.g., polyisocyanates, acid chlorides or epoxy compounds, etc.) as the hydrophobic monomer.

In situ polymerization includes processes wherein the capsule wall membrane is formed from the inside of the core material by polymerization of monomers and wherein the capsule wall membrane is formed from the outside of the core material. The former process has the drawbacks that suitable core materials are limited because polyisocyanates and the like are necessary to obtain good capsule wall membranes. In the latter process, amino resins are generally used for the membrane (for example, urea-formaldehyde and melamine-formaldehyde resins).

In recent years, with the increasing application of microcapsules, processes have been desired in which (1) it is possible to employ a variety of core materials, (2) it is possible to carry out encapsulation at a high concentration and high yield, (3) the cost of encapsulation is low, (4) the encapsulation step can be easily controlled, (5) the capsule wall is durable to temperature, humidity and various solvents (6) the capsule wall does not deteriorate, (7) capsules having a desired particle size and physical strength can be obtained, (8) the capsule slurry has a low viscosity, and (9) the time for encapsulation is short.

The interfacial polymerization process and the in situ polymerization process satisfy the above-described requirements to some degree. However, interfacial polymerization and in situ polymerization in which the capsule wall membrane is formed from the inside of the core material by polymerization of monomers have the drawback that suitable core materials are restricted because a compound having high reactivity is used as the monomer for the capsule wall. Thus, in the in situ polymerization, it is preferred to utilize a process wherein the capsule wall membrane is formed from the outside of the core material by polymerization of a monomer such as described in Japanese Patent Publication Nos. 12380/62, 12518/63 and 14379/69, British Pat. Nos. 1,355,124 and 2,006,709, Japanese Patent Application (OPI) No. 144383/76 (the term "OPI" as used herein refers to a "published unexamined Japanese patent application"), and U.S. Pat. Nos. 3,516,941, 4,001,140, 4,105,823, 4,089,802, 4,087,376 and 4,100,103, in which urea-formaldehyde resin or melamine-formaldehyde resin is used as a capsule wall.

By comparison microcapsules having a melamine-formaldehyde resin membrane are superior to those having a urea-formaldehyde resin membrane, because the membrane is more resistant to temperature, humidity and various solvents. However, in the production of microcapsules having a melamine-formaldehyde resin membrane, an aggregation of the capsule particles or an increase in the viscosity of the capsule solution easily occur during the encapsulation reaction. As a result, the production of capsules having a melamine-formaldehyde resin membrane must be carried out at low concentrations. Further, because low reaction temperatures are necessary, there is the drawback that the reaction time is long.

Processes which obviate these drawbacks to some degree have been described in U.S. Pat. No. 4,100,103 and British Pat. No. 2,006,709. According to these processes, capsule particle aggregation and increasing viscosity, etc., are overcome by using a copolymer of maleic acid anhydride and an ethylenically unsaturated monomer or a polyacrylic acid as a dispersing agent. However, these processes still do not completely prevent aggregation or the increase of viscosity. Furthermore, ethylene-maleic acid anhydride copolymer (EMA31 produced by Monsanto Co.) used in Example 1 of U.S. Pat. No. 4,100,103 and styrene-maleic acid anhydride copolymer (Scripset 520 produced by Monsanto Co.) used in Example 1 of British Pat. No. 2,006,709 have the drawback that they require a long time for dissolution. Further, the above-described Scripset 520 has the restriction that the pH of the system is difficult to reduce during or after the reaction, because addition of acid causes precipitation and aggregation of the capsules. Consequently, it is difficult to achieve a pH of 4.5 to 2.0 which is effective for removing residual formalin by the addition of urea after the capsulation reaction. Further, it is difficult to add acid to the capsule solution during the reaction to reduce the pH of the system in order to increase the reaction rate or strengthen the membrane.

SUMMARY OF THE INVENTION

Accordingly, the first object of the present invention is to provide a process for producing a capsule solution wherein encapsulation is carried out at a high concentration without aggregation of capsules.

The second object of the present invention is to provide a process for producing a capsule solution in which an increase in viscosity of the capsule solution is small.

The third object of the present invention is to provide a process for producing a capsule solution in which conditions for removing residual formaldehyde are easily adopted.

The fourth object of the present invention is to provide a process for producing a capsule solution in which the pH of the system can be easily reduced by adding acid during the reaction in order to increase the reaction rate and strengthen the membranes.

The fifth object of the present invention is to provide a dispersing agent for core materials capable of dissolving in a short time.

The sixth object of the present invention is to provide a process for producing capsules containing smaller amounts of melamine and formaline in the capsule wall membrane, whereby the encapsulation cost is low and the amount of residual formalin is reduced.

These objects have been attained by a process for producing capsule membranes comprising a melamine-formaldehyde resin wherein the polymer resin membrane is formed around the core material emulsified or dispersed in the aqueous vehicle and a styrenesulfonic acid polymer is incorporated in the system. Further, according to the present invention, a capsule solution having a high concentration (i.e., the upper limit is 70 wt%) can be obtained.

DETAILED DESCRIPTION OF THE INVENTION

As the styrenesulfonic acid polymer used in the present invention, polystyrenesulfonic acid and copolymers containing styrenesulfonic acid as a component are preferred. Among them, polystyrenesulfonic acid is particularly preferred. Examples of copolymers containing styrenesulfonic acid include copolymers of styrenesulfonic acid and acrylic acid, maleic acid anhydride, ethylene or ethylene derivatives. Examples of these copolymers include the following.

Acrylic acid-styrenesulfonic acid copolymer
Maleic acid anhydride-styrenesulfonic acid copolymer
Acrylic acid ester-styrenesulfonic acid copolymer
Vinyl acetate-styrenesulfonic acid copolymer
Vinylpyrrolidone-styrenesulfonic acid copolymer
Styrene-styrenesulfonic acid copolymer
Vinylsulfonic acid-styrenesulfonic acid copolymer
Methoxyvinyl-styrenesulfonic acid copolymer
Isobutylene-styrenesulfonic acid copolymer
Isopropyl-styrenesulfonic acid copolymer The styrenesulfonic acid polymer used in the present invention may be present as the free acid or a portion of sulfonic acid groups in the molecule may be in the salt form. As typical salts, there are sodium salts, potassium salts and ammonium salts. Sodium salts and potassium salts are preferred. The styrenesulfonic acid polymer used in the present invention preferably has a weight average molecular weight of about 5,000 to 2,000,000, preferably about 10,000 to 1,500,000, and more preferably about 100,000 to 1,000,000.

The styrenesulfonic acid polymer is used as an aqueous solution. The amount of the styrenesulfonic acid polymer used in the capsule production system is in a ratio of about 0.2 to 20 and preferably about 0.5 to 10 by weight based on the melamine added. If the amount is less, an increase in viscosity and aggregation occur during the capsulation. Generally a ratio of about 0.5 to 5 is used for economic reasons, the dispersing or emulsifying rate and the size of capsules, etc.

Other anionic high molecular electrolytes such as maleic acid anhydride copolymers, carboxy modified polyvinyl alcohol, polyacrylic acid, carboxymethyl cellulose, polyethylenesulfonic acid, sulfonated starch, sulfonated cellulose, lignin sulfonic acid and gum arabic, etc., may be used in combination with the styrenesulfonic acid polymer in the present invention. Typically they may be used in an amount of 50% by weight or less based on the styrenesulfonic acid polymer.

As a starting material for producing the capsule membrane composed of melamine-formaldehyde polymer, an aqueous solution of a mixture of melamine and formaldehyde or methylolmelamine is used. Methylol melamine can be easily obtained by heating melamine and formalin in a weakly alkaline state. Commercially available methylol melamine may be used as the starting material.

The molar ratio of melamine and formaldehyde has a great influence upon the wall tightness, strength and shape of the membrane of the resulting capsule walls, a desirable molar ratio of formaldehyde to melamine is about 1.5 to 4, preferably about 2 to 3. The aqueous solution of melamine and formaldehyde preferably contains solid melamine dispersed therein.

A summary of the encapsulation steps used in the present invention is shown below:

(a) Preparation of an aqueous solution of melamine-formaldehyde prepolymer.

(b) Preparation of an aqueous solution of styrenesulfonic acid polymer.

(c) Dispersion or emulsification of a core material in the aqueous solution of styrenesulfonic acid polymer.

(d) Adding solution (c) to solution (a) or adding slution (a) to solution (c). (If necessary, the mixture of solution (c) and solution (a) is diluted with water).

(e) Controlling the pH of the solution (d).

(f) Encapsulation by forming the melamine-formaldehyde resin by raising the temperature.

(g) Processing residual formaldehyde by adding a formalin scavenger after, if necessary, adjusting the pH.

Preparation of the melamine-formaldehyde prepolymer is carried out by heating the melamine-formaldehyde solution at a pH of 6 to 10. The heating temperature is 40° C. or more and preferably about 50° to 70° C., which is sufficient if methylol melamine is partially formed to produce a transparent solution.

The aqueous solution of styrenesulfonic acid polymer is prepared by dissolving the polymer in a suitable amount of water with heating after being dispersed therein. The styrenesulfonic acid polymer is used in an amount of about 1 to 20 parts (by weight) per 100 parts of the core material, but the amount depends generally upon the concentration at encapsulation, the particle size of the capsules and the viscosity. If the amount is small, good capsules are difficult to produce, because the slurry aggregates with encapsulation. Though a preferred pH for the emulsion system (solution (c)) is in the range of 1 to 8, a range of about 2 to 7 is particularly preferred for the dispersibility of some core materials, emulsification properties, stability of the dispersion or emulsion and preventing the occurrence of large particles upon mixing with the aqueous solution of methylol melamine.

Further, in order to increase the stability of the emulsion of the core material, a polyvalent isocyanate may be added in an amount of about 0.05 to 0.5 part (by weight) per 100 parts of the core material, according to the reactivity of the core material. The preferred examples of the polyvalent isocyanate include phenylenediisocyanate, tolylenediisocyante, diphenylmethanediisocyanate, triphenylmethanetriisocyanate, toluenetriisocyanate or polyisocyanate prepolymer as adduct thereof.

The step of mixing the aqueous solution of methylol melamine and the dispersion or emulsion of the core material is carried out by pouring the dispersion or emulsion of the core material into the aqueous solution of methylol melamine or vice versa. However, the former manner is more preferred, because formation of large particles is prevented.

The pH of the system (solution (d)) is set at about 4.0 to 6.5 after, if necessary, diluting the mixture with water. In general, as the pH controlling agent, acids or alkalis are suitably used. Considering the difficulty of encapsulation, aggregation of capsules and concentration of encapsulation, a preferred pH is in the range of about 5.0 to 6.5 and particularly about 5.5 to 6.3. Formation of capsules is initiated by heating. The reaction time depends upon the reaction temperature. 1 hour is sufficient at 60° C. The reaction temperature is typically about 40° C. to 100° C. and preferably about 50° C. to 100° C.

It is important for environmental and health reasons to process the residual free formaldehyde. For this purpose, a formalin scavenger is added to the resulting capsule slurry. As the formalin scavenger, urea, sulfites, hydrogen sulfites, ethylene urea and hydroxylamine hydrochloride, etc., can be used. For optimum reaction conditions, it is necessary to control the pH of the capsule slurry. For example, when urea or ethylene urea is used as the scavenger, the pH of the system should be in the acid region. The preferred pH is 4 or less, in which case residual formaldehyde is effectively removed. This is possible in the present invention because the capsule slurry neither increases in viscosity nor aggregates in the low pH region. Heat treatment is also effective for carrying out the scavenger reaction.

In the present invention, examples of the core material which becomes the nucleus of each capsule include natural mineral oils, animal oils, vegetable oils and synthetic oils, etc. Examples of the mineral oils include petroleum and fractions thereof such as kerosene, gasoline, naphtha and paraffin oil. Examples of the animal oils include fish oils and lard oils, etc. Examples of the vegetable oils include peanut oil, linseed oil, soybean oil, castor oil and corn oil, etc. Examples of the synthetic oils include biphenyl compounds (for example, isopropylbiphenyl and isoamylbiphenyl), terphenyl compounds (for example, German Patent Application (OLS) No. 2,153,635), phosphoric compounds (for example, triphenyl phosphate), naphthalene compounds (for example, German Patent Application (OLS) No. 2,141,194), methane compounds (for example, German Patent Application (OLS) No. 2,153,634), phthalic acid compounds (for example, diethyl phthalate, dibutyl phthalate and dioctyl phthalate) and salicyclic acid compounds (for example, ethyl salicylate), etc. To these natural mineral oils, animal oils, vegetable oils and synthetic oils, it is possible to add agricultural medicines, medicines, perfumes, chemicals, adhesives, liquid crystals, foods, detergents, dyes, dye precursors, couplers, catalysts and rust inhibitors, etc., according to the purpose of use.

The size of microcapsules can be suitably adjusted according to the use. In case of using for pressure-sensitive recording paper, the capsule size is preferably in the range of about 1 to 20 microns, preferably about 1.5 to 10 microns, and more particularly about 2 to 8 microns.

The present invention is particularly useful for production of microcapsules and, more so, for production of microcapsules for pressure-sensitive recording paper. Namely, according to the process of the present invention, capsule solutions having a high concentration and a low viscosity can be obtained. Further, microcapsules obtained according to the present invention have excellent heat resistance and low permeability. This heat resistance means a difficulty of scattering of the core material to the outside of microcapsules when microcapsules coated and dried on a paper are allowed to stand for 10 hours at 100° C. in oven. Namely, the more difficult the scattering of the core material is, the more excellent the capsules are.

In the system of the present invention, it is also easier to wash the reactor. Thus, it is possible to obtain an excellent effect with respect to production.

The microcapsule solution produced according to the present invention is applied to bases such as paper according to a suitable conventional method. In particular, curtain coating as described in U.S. Pat. No. 3,508,947, blade coating as described in Japanese Patent Publication No. 35330/74 and air knife coating, etc., can be easily utilized for capsule solutions having various viscosities.

The present invention is now illustrated in detail with reference to examples, but the present invention is not limited to the examples.

EXAMPLE 1

5 g of partial sodium salt of polyvinylbenzenesulfonic acid (VERSA TL 500, produced by National Starch Co., average molecular weight 500,000) was added to 95 g of hot water at about 80° C. with stirring to dissolve. After about 30 minutes, the resulting solution was cooled. The pH of the aqueous solution was 2 to 3. To the solution, a 20 wt% aqueous solution of sodium hydroxide was added to adjust the pH to 4.0. A hydrophobic solution obtained previously by dissolving 4 g of Crystal Violet Lactone (CVL) in 100 g of KMC-113 (an alkylnaphthalene containing diisopropylnaphthalene as a main component, produced by Kureha Chemical Ind. Co.) was dispersed in 100 g of the above-described 5% aqueous solution of partial sodium salt of polyvinylbenzenesulfonic acid to prepare an emulsion having 4.5μ of the average particle size. On the other hand, 6 g of melamine, 11 g of a 37 wt% aqueous solution of formaldehyde and 83 g of water were mixed with stirring at 60° C. for 30 minutes to prepare a transparent aqueous solution of mixture of melamine, formaldehyde and melamine-formaldehyde precondensate. The pH of the aqueous solution of the mixture was 6 to 8. Hereinafter, this aqueous solution melamine, formaldehyde and melamine-formaldehyde precondensate is referred to as the precondensate solution. The precondensate solution obtained by the above-described method was added to the above-described emulsion, and a 20 wt% solution of acetic acid was added with stirring to adjust the pH to 6.0. As stirring was continued the liquid temperature was raised to 65° C., capsules having excellent heat resistance were obtained after 30 minutes. After 60 minutes, capsules having excellent oil resistance were formed, from which the core material was not extracted with oils such as linseed oil or Solvent No. 5 (petroleum solvent produced by Nippon Oil Co., Ltd.), etc. This capsule solution was cooled to room temperature and the pH thereof was adjusted to 9.0 with 20 wt% sodium hydroxide. The viscosity was 70 cps at 25° C. In order to examine the state of aggregation of the capsule particles, 300 g of water was added thereto and the solution was filtered with a 200 mesh screen. Residues were hardly observed, and a capsule solution for pressure-sensitive recording paper was obtained, which was suitable on production because of its low viscosity. However, as a result of measurement by an acetyl acetone process, the amount of the residual formaldehyde was 1,800 ppm before adjustment of the pH to 9.0 after the capsulation reaction. In order to remove this residual formaldehyde, the pH of the system for the encapsulation reaction was adjusted to 4.0 with using 1 N hydrochloric acid after the lapse of 60 minutes at 65° C., and 30 g of a 40 wt% aqueous solution of urea was added thereto. Stirring was continued at 65° C. After 40 minutes, the pH of the system was adjusted to 9.0 using 20 wt% sodium hydroxide. The amount of residual formaldehyde in the resulting capsule solution was 180 ppm, which was tolerable for application of the capsule solution.

COMPARISON EXAMPLE 1

5 g of styrene-maleic acid anhydride copolymer (Scripset 520, produced by Monsanto Co.) was dissolved in 95 g of hot water at about 80° C. with stirring, adjusting the pH to 4.0 with sodium hydroxide. About 6 hours were required for dissolution. The capsulation reaction was carried out in the same manner as in Example 1 except that the 5 wt% aqueous solution of styrene-maleic acid anhydride copolymer obtained above was used instead of the aqueous solution of partial sodium salt of polyvinylbenzenesulfonic acid. The resulting capsule solution was cooled to room temperature, and the pH thereof was adjusted to about 9.0 with 20 wt% sodium hydroxide. The viscosity was 150 cps at 25° C. Further, in order to examine the state of aggregation of the capsule particles, 300 g of water was added thereto and the solution was filtered with a 200 mesh screen. 0.2 g of the residue was observed and the capsule solution was not suitable on production. Further, when the pH was reduced in the same manner as in Example 1 in order to remove residual formaldehyde, stirring was not possible because of the increase in the viscosity, and it was impossible to remove residual formaldehyde by the addition of urea.

COMPARISON EXAMPLE 2

5 g of ethylene-maleic acid anhydride copolymer (EMA 31, produced by Monsanto Co.) was dissolved in 95 g of hot water at 80° C. with stirring. About 3 hours were required for dissolution. The encapsulation reaction was carried out in the same manner as in Example 1 except that the 5 wt% aqueous solution of ethylene-maleic acid anhydride copolymer obtained above was used instead of the aqueous solution of partial sodium salt of polyvinylbenzenesulfonic acid. The resulting capsule solution was cooled to room temperature, and the pH thereof was adjusted to 9.0 with 20 wt% sodium hydroxide. The viscosity was 1,000 cps at 25° C. Further, in order to examine the state of aggregation of the capsule particles, 300 g of water was added thereto and the solution was filtered with a 200 mesh screen. 0.4 g of the residue was observed, and the capsule solution was not suitable for production, because of its high viscosity and large amount of residue.

Comparisons of capsules, capsule solutions and processes in Example 1 and Comparison Examples 1 and 2 are shown in the following table.

TABLE

| Property | Viscosity (25° C., cps) | Aggregation[4] (g) | Solubility[1] of Anionic High Molecular Material (hr) | Residual[2] Formaldehyde Removal | Color Forming[3] Ability |
|---|---|---|---|---|---|
| Anionic high molecular material: | | | | | |
| Partial sodium salt of polyvinylbenzene-sulfonic acid (Example 1) | 70 | 0.0 | 0.5 | Good | No deterioration |
| Styrene-maleic acid anhydride copolymer (Comparison Example 1) | 150 | 0.2 | 6 | Inferior | Slight deterioration |
| Ethylene-maleic acid anhydride copolymer | 1,000 | 0.4 | 3 | Good | Slight deterioration |

| Property | Viscosity (25° C., cps) | Aggregation[4] (g) | Solubility[1] of Anionic High Molecular Material (hr) | Residual[2] Formaldehyde Removal | Color Forming[3] Ability |
|---|---|---|---|---|---|
| (Comparison Example 2) | | | | | |

[1] Time to dissolve
[2] By urea
[3] For microcapsule coated paper after heated to 100° C. for 10 hours
[4] Amount of aggregate collected on a 200 mesh screen

EXAMPLE 2

5 g of vinylbenzenesulfonic acid-maleic acid copolymer (NATROL 72, produced by National Starch Co.) was dissolved in 95 g of hot water at about 80° C. with stirring. After about 10 minutes, the resulting solution was cooled. The pH of the aqueous solution was about 6.5. To the solution, a 5 N aqueous solution of hydrochloric acid was added to adjust the pH to 3.

A hydrophobic solution obtained previously by dissolving 4 g of Crystal Violet Lactone (CVL) in 100 g of KMC 113 was dispersed by emulsifying in 100 g of the above-described 5% aqueous solution of vinylbenzenesulfonic acid-maleic acid anhydride copolymer to prepare an emulsion having an average particle size of 4.5μ. On the other hand, 6 g of melamine, 11 g of 37 wt% formalin and 83 g of water were mixed with stirring at 60° C. to prepare a transparent aqueous solution of the mixture after 30 minutes.

The resulting precondensate solution was added to the above-described emulsion, and a 20 wt% solution of acetic acid was added with stirring to adjust the pH to 6.0. Stirring was continued as the temperature was raised to 65° C., capsules having excellent heat resistance were formed after 30 minutes. After 60 minutes, capsules having excellent oil resistance were formed, from which the core material was not extracted with oils such as linseed oil or Solvent No. 5, etc.

This capsule solution was cooled to room temperature and the pH thereof was adjusted to 9.0 with 20 wt% sodium hydroxide. The viscosity was 80 cps at 25° C. In order to examine the state of aggregation of capsule particles, 300 g of water was added thereto and the solution was filtered with a 200 mesh screen. Residue was hardly observed, and a capsule solution suitable for pressure-sensitive recording paper manufacture was obtained because of having a low viscosity.

EXAMPLE 3

An emulsion having an average particle size of about 4.5μ was obtained by emulsifying as in Example 1 except that 0.3 g of polyisocyanate (MILLIONATE MR100 produced by Nippon Polyurethane Kogyo Co.) was added to 100 g of the hydrophobic solution in Example 1. The resulting emulsion had good stability, and aggregation did not occur even when stored for 1 week with stirring. A capsule solution obtained in the same manner as in Example 1 using the above-described processed emulsion was the capsule solution contained fewer large particles as a result of aggregation as compared to the capsule solution in Example 1. Further, in order to examine the state of aggregation of capsule particles, 300 g of water was added thereto and the solution was filtered with a 200 mesh screen. Residue was hardly observed, and a capsule solution for pressure-sensitive recording paper was obtained, which was suitable on production because of having a low viscosity.

While the invention has been described in detail and with reference to specific embodiments thereof, it will be apparent to one skilled in the art that various changes and modifications can be made therein without departing from the spirit and scope thereof.

We claim:

1. A process for producing microcapsules consisting essentially of the steps of: (a) preparing a solution of melamine and formaldehyde prepolymer, (b) preparing a solution of a styrene-sulfonic acid polymer, (c) dispersing a core material in said styrene-sulfonic acid polymer solution, (d) mixing said melamine-formaldehyde prepolymer solution and said styrene-sulfonic acid polymer solution, (e) heating said solutions to form microcapsules having melamine-formaldehyde members wherein the ratio of styrene-sulfonic acid polymer to melamine in the capsule production system is about 0.2 to 20.

2. The process of claim 1 which additonally comprises the step: (f) of removing residual formaldehyde after capsule formation.

3. The process of claim 2 wherein said residual formaldehyde is removed by adding urea and reacting at a pH less than or equal to 4.

4. The process of claim 1 wherein said melamine-formaldehyde prepolymer is prepared by heating a solution of melamine and formaldehyde at a pH of 6 to 10 at temperatures of 40° C. or higher.

5. The process of claim 1 wherein said styrene-sulfonic acid polymer is present in an amount of 1 to 20 parts by weight per 100 parts by weight core material.

6. The process of claim 1 wherein the pH of said emulsion system is about 1 to 8.

7. The process of claim 1 wherein said emulsion system additionally contains a polyvalent isocyanate.

8. The process of claim 1 wherein said styrene-sulfonic acid polymer is polystyrene-sulfonic acid.

9. The process of claim 1 wherein said styrene-sulfonic acid polymer is a copolymer of styrene-sulfonic acid.

10. The process of claim 9 wherein said copolymer is a copolymer of acrylic acid, maleic acid anhydride, ethylene, or an ethylene derivative and styrene-sulfonic acid.

* * * * *